United States Patent
Yeh

(10) Patent No.: US 11,314,283 B2
(45) Date of Patent: Apr. 26, 2022

(54) FOLDABLE DISPLAY DEVICE

(71) Applicant: WUHAN CHINA STAR OPTOELECTRONICS SEMICONDUCTOR DISPLAY TECHNOLOGY CO., LTD., Wuhan (CN)

(72) Inventor: Shanghung Yeh, Wuhan (CN)

(*) Notice: Subject to any disclaimer, the term of this patent is extended or adjusted under 35 U.S.C. 154(b) by 446 days.

(21) Appl. No.: 16/469,158

(22) PCT Filed: Apr. 26, 2019

(86) PCT No.: PCT/CN2019/084533
§ 371 (c)(1),
(2) Date: Jun. 13, 2019

(87) PCT Pub. No.: WO2020/119008
PCT Pub. Date: Jun. 18, 2020

(65) Prior Publication Data
US 2021/0181795 A1 Jun. 17, 2021

(30) Foreign Application Priority Data
Dec. 13, 2018 (CN) .......................... 201811527622.4

(51) Int. Cl.
*G06F 1/16* (2006.01)
*E05D 3/12* (2006.01)
*E05D 7/00* (2006.01)

(52) U.S. Cl.
CPC ........... *G06F 1/1641* (2013.01); *E05D 3/122* (2013.01); *E05D 7/00* (2013.01); *G06F 1/1652* (2013.01); *G06F 1/1681* (2013.01); *E05Y 2900/606* (2013.01)

(58) Field of Classification Search
CPC combination set(s) only.
See application file for complete search history.

(56) References Cited

U.S. PATENT DOCUMENTS

| | | | |
|---|---|---|---|
| 9,348,450 B1 | 5/2016 | Kim | |
| 9,557,771 B2* | 1/2017 | Park | G06F 1/1681 |
| 9,600,035 B2* | 3/2017 | Park | G06F 1/1681 |
| 10,133,303 B2* | 11/2018 | Park | G06F 1/1681 |
| 10,365,692 B2* | 7/2019 | Yeh | G06F 1/1616 |
| 10,423,019 B1* | 9/2019 | Song | G06F 1/1681 |
| 10,474,196 B2* | 11/2019 | Yeh | G06F 1/1641 |
| 10,768,667 B2* | 9/2020 | Lin | G06F 1/1681 |
| 11,048,305 B1* | 6/2021 | Ye | H04M 1/0249 |
| 2017/0123455 A1* | 5/2017 | Park | G06F 1/1681 |
| 2018/0267571 A1 | 9/2018 | Chen | |
| 2018/0279489 A1 | 9/2018 | Ochi et al. | |
| 2019/0018458 A1 | 1/2019 | Turchin et al. | |

(Continued)

FOREIGN PATENT DOCUMENTS

| | | |
|---|---|---|
| CN | 106205385 A | 12/2016 |
| CN | 106910427 A | 6/2017 |

(Continued)

*Primary Examiner* — Lisa Lea-Edmonds

(57) ABSTRACT

A foldable display device is provided, which can effectively release stress in a bending state by a combination of a surface frame bending device, a surface frame slide device, and a surface frame elastic device, thereby ensuring that the display panel can be smoothly bent without wrinkles and breakage damage.

19 Claims, 4 Drawing Sheets

(56) References Cited

U.S. PATENT DOCUMENTS

| | | | |
|---|---|---|---|
| 2019/0041913 A1* | 2/2019 | Yeh | G06F 1/1652 |
| 2019/0041914 A1* | 2/2019 | Yeh | G06F 1/1616 |
| 2019/0073002 A1 | 3/2019 | Wu et al. | |
| 2020/0103941 A1* | 4/2020 | Lin | H04M 1/0216 |
| 2021/0108677 A1* | 4/2021 | Bae | G06F 1/1652 |
| 2021/0141422 A1* | 5/2021 | Seo | G06F 1/1652 |
| 2021/0200277 A1* | 7/2021 | Park | E05D 3/122 |
| 2021/0223826 A1* | 7/2021 | Ye | H04M 1/0206 |

FOREIGN PATENT DOCUMENTS

| | | |
|---|---|---|
| CN | 107102692 A | 8/2017 |
| CN | 107331302 A | 11/2017 |
| CN | 107358874 A | 11/2017 |
| CN | 107731100 A | 2/2018 |
| CN | 108028029 A | 5/2018 |
| CN | 108510890 A | 9/2018 |
| CN | 108648624 A | 10/2018 |

\* cited by examiner

FOLDABLE DISPLAY DEVICE

FIELD OF DISCLOSURE

The present disclosure relates to displays, and more particularly to a foldable display device.

BACKGROUND OF DISCLOSURE

With development of flexible display panel technologies, foldable or curable display devices have become an extremely important development direction in future display technologies. Since flexible display panels have advantages of being thin, non-fragile, bendable, foldable, and wearable, they can be used for bendable and deformable electronic products such as smart watches, car displays, and the like.

During folding or bending process of a display device, a bending region of a flexible display panel generates a large stress, and the stress is not released, which may cause the stress in the bending region to be too concentrated to cause cracking or wrinkling. Therefore, it is necessary to provide suitable mechanical components inside the display device, so that after the flexible display panel is bent, the bending region can naturally expand a conformation, and the stress is released to avoid damage caused by the bending.

SUMMARY OF DISCLOSURE

The present application provides a foldable display device, so as to solve a technical problem that the flexible display panel is broken or wrinkled due to stress concentration.

To solve the above problem, a technical solution provided by the present application is as follows:

An embodiment of the present application provides a foldable display device comprising:
  an outer case comprising at least a housing;
  a middle frame mounted to the outer case, wherein the middle frame comprises at least two frame plates and a middle frame bending apparatus located between the frame plates;
  a display panel mounted to the middle frame, wherein the display panel comprises a panel bending region opposite to the middle frame bending apparatus; and
  a surface frame apparatus mounted to the outer case and comprising:
    at least a surface frame, wherein an opening is disposed in the surface frame, and the display panel is engaged into the opening;
    a surface frame bending apparatus opposite to the middle frame bending apparatus;
    wherein when the display panel is in a bending state, the middle frame bending apparatus and the surface frame bending apparatus form a first cavity, and the panel bending region is bent into the first cavity; and
    wherein when the display panel is in a non-bending state, the surface frame bending apparatus causes the panel bending region to be in a flattened state by supporting the middle frame bending apparatus.

In a foldable display device of the present application, the display panel is a flexible display panel.

In a foldable display device of the present application, the outer case is in a split type.

In a foldable display device of the present application, the display panel comprises:
  a first region located at one side of the panel bending region and a second region located at another side of the panel bending region, and
  wherein when the display panel is in the bending state, the first region is opposite to the second region.

In a foldable display device of the present application, the outer case comprises:
  a first housing opposite to the first region; and
  a second housing opposite to the second region, wherein the first housing and the second housing are connected with the surface frame by screw bolts.

In a foldable display device of the present application, the foldable display device further comprises fifth through holes formed in the outer case, wherein the first housing and the second housing are connected with the surface frame by the screw bolts passing through the fifth through holes.

In a foldable display device of the present application, the foldable display device further comprises at least four of the fifth through holes formed in the outer case.

In a foldable display device of the present application, the foldable display device further comprises sixth through holes aligned with the fifth through holes in a one-to-one manner, wherein the outer case is rigidly connected to the surface shell by the screw bolts passing through the fifth through holes and the sixth through holes.

In a foldable display device of the present application, hole size of one of the fifth through holes is equal to hole size of the aligned one of the sixth through holes, and center of one of the fifth through holes is in a same straight line as center of the aligned one of the sixth through holes.

In a foldable display device of the present application, shape and size of the first housing is the same with shape and size of the second housing.

In a foldable display device of the present application, the outer case comprises a first housing opposite to the first region and a second housing opposite to the second region;
  wherein the first housing comprises two first housing sidewalls disposed in parallel and a first housing connecting wall vertically connected with the two first sidewalls;
  wherein the second housing comprises two second housing sidewalls disposed in parallel and a second housing connecting wall vertically connected with the two second sidewalls; and
  wherein the two first housing sidewalls together with the first housing connecting wall form a first housing open cavity, the two second housing sidewalls together with the second housing connecting wall form a second housing open cavity, and the display panel displays a picture through the first housing open cavity and the second housing open cavity.

In a foldable display device of the present application, the surface frame apparatus comprises a first surface frame and a second surface frame;
  wherein the surface frame bending apparatus comprises at least a first gear tooth disposed on the first surface frame and at least a second gear tooth disposed on the second surface frame;
  wherein the first gear tooth on the first surface frame is engaged with the second gear tooth on the second surface frame; and
  wherein the first gear tooth further comprises a first support plane, and the second gear further comprises a second support plane, wherein the first support plane and the second support plane are configured to support the middle frame bending apparatus.

In a foldable display device of the present application, the first surface frame comprises two first surface frame sidewalls in parallel and a first surface frame connecting sidewall vertically connected with the two first surface frame sidewalls; and wherein the second surface frame comprises two second surface frame sidewalls in parallel and a second surface frame connecting sidewall vertically connected with the two first surface frame sidewalls.

In a foldable display device of the present application, the first gear tooth and the second gear tooth are semicircular.

In a foldable display device of the present application, the first gear tooth is located at an edge of the first surface frame sidewall, and the second gear tooth is located at an edge of the second surface frame sidewall.

In a foldable display device of the present application, the surface frame bending apparatus further comprises:

at least a connecting plate;

at least two hinge plates oppositely disposed, protruding, and vertical to a surface at a side of the connecting plate, wherein the two hinge plates are disposed at two ends of the connecting plate, respectively; and each of the two hinge plates is disposed with a first through hole and a second through hole, wherein the first through hole is aligned with the first gear tooth, and the second through hole is aligned with the second gear tooth.

In a foldable display device of the present application, the first gear tooth is further disposed with a third through hole aligned with the first through hole, and the second gear tooth is further disposed with a fourth through hole aligned with the second through hole;

wherein hole size of the first through hole is equal to hole size of the third through hole, and center of the first through hole is in a same straight line as center of the third through hole; and wherein hole size of the second through hole is equal to hole size of the fourth through hole, and center of the second through hole is in a same straight line as center of the fourth through hole.

In a foldable display device of the present application, the middle frame further comprises a first frame plate and a second frame plate disposed at two sides of the middle frame bending apparatus;

wherein each of the first frame plate and the second frame plate is aligned with the housing, and each of the first frame plate and the second frame plate together with the housing form a gap;

wherein the middle frame bending apparatus comprises a first movable plate and a second movable plate, wherein the first movable plate is rotatably mounted on the first surface frame, and the second movable plate is rotatably mounted on the second surface frame;

wherein when the display panel is in a non-bending state, upper surfaces of the frame plate, the first movable plate, and the second movable plate are located in a same plane; and wherein when the display panel is in a bending state, the first movable plate and the second movable plate are moved into the first cavity.

In a foldable display device of the present application, the surface frame apparatus further comprises at least a surface frame slide apparatus; and wherein the surface frame slide apparatus comprises:
a first component disposed with a first protrusion;
a second component disposed with a first groove;

wherein when the display panel is in a non-bending state, the first protrusion is adjacent to the first groove and is docked with the first groove; and wherein when the display panel is in a bending state, the first protrusion is away from the first groove.

In a foldable display device of the present application, the surface frame apparatus further comprises at least a surface frame elastic apparatus; and wherein the surface frame slide apparatus comprises:
a third component comprising a second protrusion;
a fourth component comprising a second groove;
an elastic component disposed in the second groove;
a mounting plate rigidly connected with the fourth component;

wherein when the display panel is in a non-bending state, the second protrusion is adjacent to the second groove and presses the elastic component to dock with the second groove; and wherein when the display panel is in a bending state, the second protrusion is away from the second groove.

Beneficial effects of the application are that: the present application provides a new foldable display device, which can effectively release stress in a bending state by a combination of a surface frame bending device, a surface frame slide device, and a surface frame elastic device, thereby ensuring that the display panel can be smoothly bent without wrinkles and breakage damage

DESCRIPTION OF DRAWINGS

In order to more clearly describe embodiments of the present disclosure or technical solutions in a conventional technology, drawings required to be used for the embodiments or descriptions of the conventional technology are simply described hereinafter. Apparently, the drawings described below only illustrate some embodiments of the present disclosure. Those skilled in the art can obtain other drawings based on these drawings disclosed herein without creative effort.

DETAILED DESCRIPTION OF PREFERRED EMBODIMENTS

The following description of each embodiment with reference to the appended drawings is used for illustrating specific embodiments which may be used for carrying out the present disclosure. The directional terms described by the present disclosure, such as "upper", "lower", "front", "back", "left", "right", "inner", "outer", "side", etc. are only directions by referring to the accompanying drawings. Thus, the used directional terms are used to describe and understand the present disclosure, but the present disclosure is not limited thereto. In figures, elements with similar structures are indicated with the same numbers.

Figure 1:
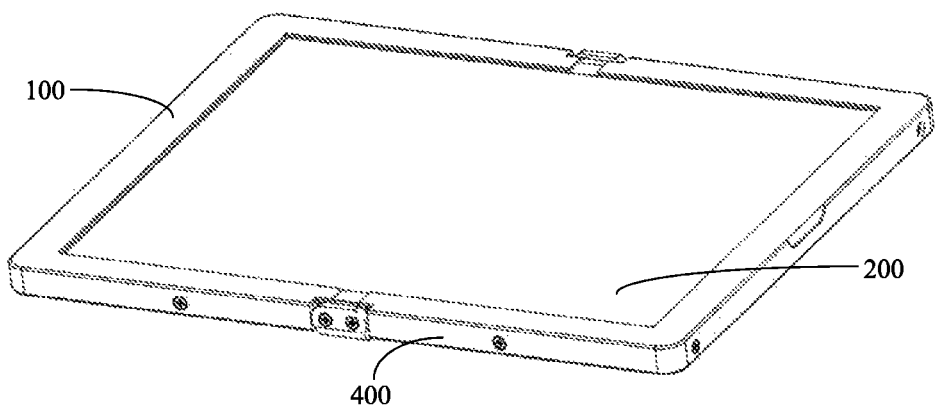
FIG. 1 is a three-dimensional structural diagram of a foldable display device of the present application.

Refer to FIG. 1, which is a three-dimensional structural diagram of a foldable display device of the present application.

Figure 2:
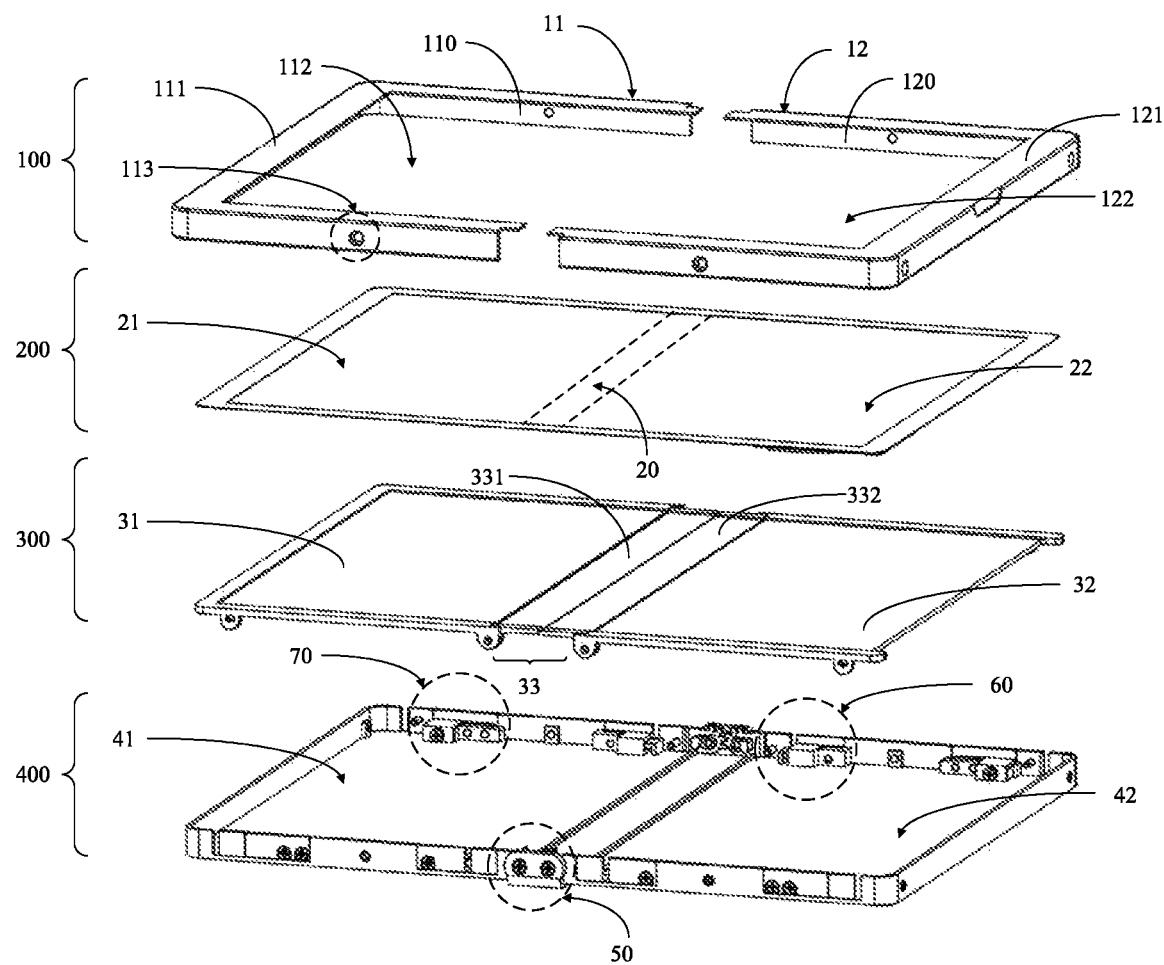
FIG. 2 is an exploded structural diagram of a foldable display device of the present application.

Refer to FIG. 2, which is an exploded structural diagram of a foldable display device of the present application.

The foldable display device comprises an outer case 100, a display panel 200, a surface frame apparatus 400, and a middle frame 300 located between the display panel 200 and the surface frame apparatus 400. The middle frame 300 is mounted into the surface frame apparatus 400. The display panel 200 is mounted onto the middle frame 300. The surface frame apparatus 400 is mounted into the outer case 100.

The middle frame 300 comprises at least two frame plates and a middle frame bending apparatus 33 located between the frame plates. The display panel 200 comprises a panel bending region 20 opposite to the middle frame bending apparatus 33.

The surface frame apparatus 400 comprises: at least a surface frame; and a surface frame bending apparatus 50, a surface frame slide apparatus 60, and a surface frame elastic apparatus 70 disposed on the surface frame. The surface frame bending apparatus 50 is opposite to the middle frame bending apparatus 33. An opening is disposed in the surface frame, and the display panel 200 is engaged into the opening.

When the display panel 200 is in a bending state, the middle frame bending apparatus 33 and the surface frame bending apparatus 50 form a first cavity 500, and the panel bending region 20 is bent into the first cavity 500. When the display panel 200 is in a non-bending state, the surface frame bending apparatus 50 causes the panel bending region 20 to be in a flattened state by supporting the middle frame bending apparatus 33.

In an embodiment, the display panel 200 is a flexible display panel, which can be bent or curved.

The display panel 200 further comprises a first region 21 located at one side of the panel bending region 20 and a second region 22 located at another side of the panel bending region 20. When the display panel is in the bending state, the first region 21 is opposite to the second region 22.

The outer case 100 comprises at least a housing.

In an embodiment, the outer case 100 is in a split type.

The outer case 100 comprises a first housing 11 opposite to the first region 21; and a second housing 12 opposite to the second region 22. The first housing 11 comprises two first housing sidewalls 110 disposed in parallel and a first housing connecting wall 111 vertically connected with the two first sidewalls 110. The second housing 12 comprises two second housing sidewalls 120 disposed in parallel and a second housing connecting wall 121 vertically connected with the two second sidewalls 120.

The two first housing sidewalls 110 together with the first housing connecting wall 111 form a first housing open cavity 112. The two second housing sidewalls 120 together with the second housing connecting wall 121 form a second housing open cavity 122, and the display panel 200 displays a picture through the first housing open cavity 112 and the second housing open cavity 122.

When the display panel 200 is bent to the limit, an angle between the first housing 11 and the second housing 12 is zero. The first housing sidewalls 110 of the first housing 11 are opposite to the second housing sidewalls 120 of the second housing 12. The first housing connecting wall 111 of the first housing 11 is opposite to the second housing connecting wall 121 of the second housing 12.

In an embodiment, the foldable display device further comprises at least four of the fifth through holes 13 formed in the outer case 100. The first housing 11 and the second housing 12 are connected with the surface frame by the screw bolts passing through the fifth through holes 13.

In an embodiment, the surface frame further comprises sixth through holes 43 aligned with the fifth through holes 13 in a one-to-one manner. Hole size of one of the fifth through holes 13 is equal to hole size of the aligned one of the sixth through holes 43, and center of one of the fifth through holes 13 is in a same straight line as center of the aligned one of the sixth through holes 43. The outer case 100 is rigidly connected to the surface shell 100 by the screw bolts passing through the fifth through holes 13 and the sixth through holes 43.

In an embodiment, shape and size of the first housing 11 is the same with shape and size of the second housing 12.

Referring to FIG. 2, the middle frame 300 comprises at least two frame plates and a middle frame bending apparatus 33 located between the frame plates. The middle frame bending apparatus 33 is opposite to the panel bending region 20.

In an embodiment, the middle frame 300 comprises a first frame plate 31 and a second frame plate 32. Each of the first frame plate 31 and the second frame plate 32 is aligned with the housing, and each of the first frame plate 31 and the second frame plate 32 together with the housing form a gap.

The middle frame bending apparatus 33 comprises a first movable plate 331 and a second movable plate 332, wherein the first movable plate 331 is rotatably mounted on the first surface frame 41, and the second movable plate 332 is rotatably mounted on the second surface frame 42.

When the display panel 200 is in a non-bending state, upper surfaces of the frame plate, the first movable plate 331, and the second movable plate 332 are located in a same plane. When the display panel 200 is in a bending state, the first movable plate 331 and the second movable plate 332 are moved into the first cavity 500.

Referring to FIG. 2, the surface frame apparatus 400 comprises a first surface frame 41 and a second surface frame 42. The first surface frame 41 is aligned with the first region 21 of the display panel 200, and the second surface frame 42 is aligned with the second region 22 of the display panel 200. The first surface frame 41 comprises two first surface frame sidewalls 411 in parallel and a first surface frame connecting sidewall 412 vertically connected with the two first surface frame sidewalls 411. The second surface frame 42 comprises two second surface frame sidewalls 421 in parallel and a second surface frame connecting sidewall 422 vertically connected with the two first surface frame sidewalls 421.

Figure 3:
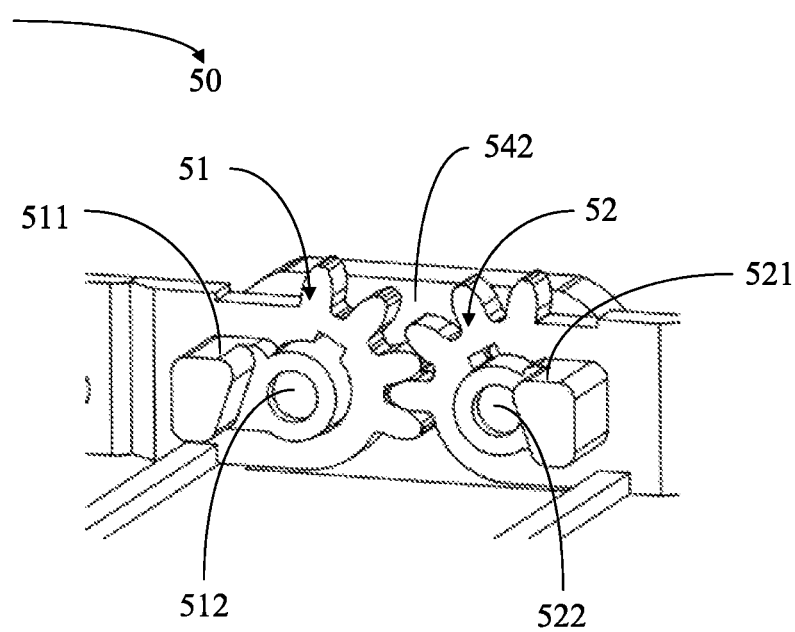
FIG. 3 is a first partial enlarged diagram of a surface frame bending apparatus in a foldable display device of the present application.

Refer to FIG. 3, which is a first partial enlarged diagram of a surface frame bending apparatus in a foldable display device of the present application.

The surface frame bending apparatus 50 comprises at least a first gear tooth 51 disposed on the first surface frame 41 and at least a second gear tooth 52 disposed on the second surface frame 42. The first gear tooth 51 is disposed on each of the first surface frame sidewalls 411. The second gear tooth 52 is disposed on each of the second surface frame sidewalls 412.

In an embodiment, the first gear tooth 51 and the second gear tooth 52 are semicircular.

The first gear tooth 51 is located at an edge of the first surface frame sidewall 411, and the second gear tooth 52 is located at an edge of the second surface frame sidewall 421. The first gear tooth 51 on the first surface frame 41 is engaged with the second gear tooth 52 on the second surface frame 42. When the first surface frame 41 and the second surface frame 42 rotate relative to each other, both of them rotate synchronously.

In an embodiment, since an angle of a rotating process of both of them ranges from 0 to 180 degrees, only semicircular teeth are required to dispose at the edge of the sidewall of the surface frame.

In an embodiment, the first gear tooth 51 further comprises a first support plane 511, and the second gear 52 further comprises a second support plane 521. The first support plane 511 and the second support plane 521 are configured to support the middle frame bending apparatus 33.

When the panel bending region 200 is in a flattened state, the first support plane 511 and the second support plane 521 are located in a same level. The first support plane 511 is configured to support the first movable plate 331, and the second support plane 521 is configured to support the second movable plate 332, so as to ensure flatness of the display panel 200 in the flattened state.

Figure 4:
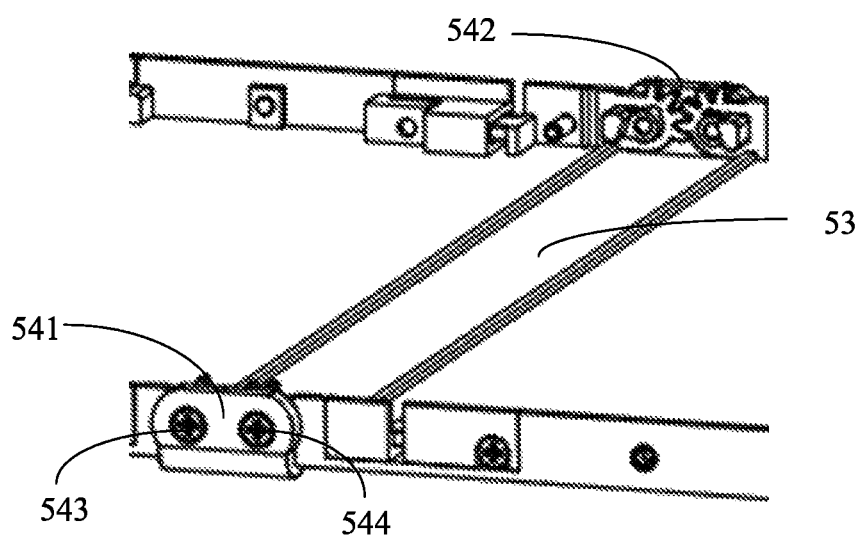
FIG. 4 is a second partial enlarged diagram of a surface frame bending apparatus in a foldable display device of the present application.

Refer to FIG. 4, which is a second partial enlarged diagram of a surface frame bending apparatus in a foldable display device of the present application.

The surface frame bending apparatus 50 further comprises at least an integrated connection plate 53 and at least two hinge plates oppositely disposed. The at least two hinge plates 54 protrude and are vertical to a surface at a side of the connecting plate 53, wherein the two hinge plates are disposed at two ends of the connecting plate 53, respectively.

The two hinge plates are a first hinge plate 541 and a second hinge plate 542 respectively, both of which are disposed opposite to each other and are disposed at two ends of the connection plate 53, respectively. The first surface frame 41, the second surface frame 42, and the connecting plate 53 can be rotated relative to each other by 0 to 90 degrees, and the angle between the first surface frame 41 and the second surface frame 42 is 0 to 180 degrees.

In an embodiment, the first hinge plate 541 and the second hinge plate 542 is further disposed with a first through hole 543 and a second through hole 544. The first through hole 543 is aligned with the first gear tooth 51, and the second through hole 544 is aligned with the second gear tooth 52.

In an embodiment, the first gear tooth 51 is further disposed with a third through hole 512 aligned with the first through hole 543, and the second gear tooth 52 is further disposed with a fourth through hole 522 aligned with the second through hole 544.

Hole size of the first through hole 543 is equal to hole size of the third through hole 512, and center of the first through hole 543 is in a same straight line as center of the third through hole 512. Hole size of the second through hole 544 is equal to hole size of the fourth through hole 522, and center of the second through hole 544 is in a same straight line as center of the fourth through hole 522.

The panel bending device further includes a first rotating shaft, a second rotating shaft, a third rotating shaft, and a fourth rotating shaft. The first rotating shaft and the third rotating shaft protrude from an inner side surface of the first hinge plate 541 and are parallel to each other. The second rotating shaft and the fourth rotating shaft protrude from an inner side surface of the second hinge plate 542 and are parallel to each other.

The first rotating shaft and the second rotating shaft rotatably pass through the first through hole 543 and the third through hole 512 located in the first surface frame 41. The first rotating shaft and the second rotating shaft are in a same straight line. The first surface frame 41 is rotatable relative to the connecting plate 53 by using the straight line as an axis, and its rotation range is 0 to 90 degrees.

The third rotating shaft and the fourth rotating shaft rotatably pass through the second through hole 544 and the fourth through hole 522 located in the second surface frame 42. The third rotating shaft and the fourth rotating shaft are in a same straight line. The second surface frame 42 is rotatable relative to the connecting plate 53 by using the straight line as an axis, and its rotation range is 0 to 90 degrees.

The second surface frame 42 has a rotating direction opposite to that of the first surface frame 41. Therefore, the angle between the first surface frame 41 and the second surface frame 42 can be adjusted from 0 to 180 degrees. In an embodiment, the first surface frame 41 and the second surface frame 42 are rotatable relative to the connecting plate 53 respectively, and there is no correlation between both of the first surface frame 41 and the second surface frame 42.

Figure 5:
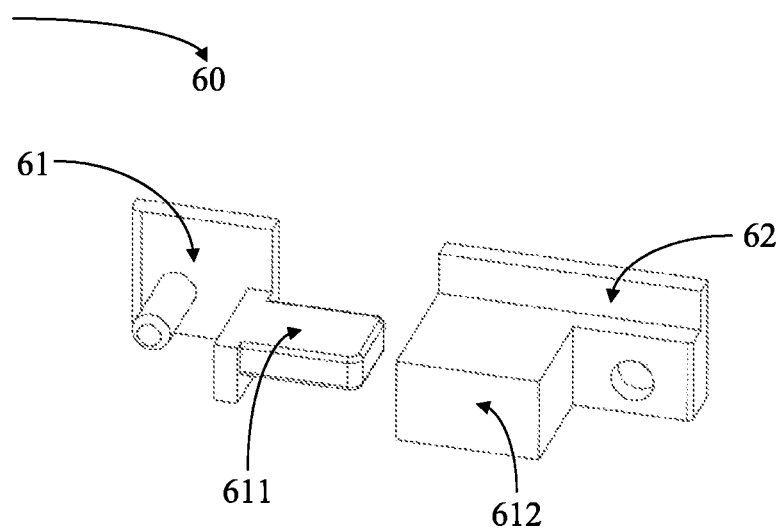
FIG. 5 is a partial enlarged diagram of a surface frame slide apparatus in a foldable display device of the present application.

Refer to FIG. 5, which is a partial enlarged diagram of a surface frame slide apparatus 60 in a foldable display device of the present application.

The surface frame apparatus 400 further comprises at least a surface frame slide apparatus 60.

In an embodiment, a sidewall of the surface frame includes a surface frame slide apparatus 60.

The surface frame slide apparatus 60 comprises:
a first component 61 disposed with a first protrusion 611, wherein the first component 61 is hinged to the first movable plate 331 or the second movable plate 332;
a second component 62 disposed with a first groove 621;
wherein when the display panel 200 is in a non-bending state, the first protrusion 611 is adjacent to the first groove 621 and is docked with the first groove 621; and
wherein when the display panel 200 is in a bending state, the first protrusion 611 is away from the first groove 621.

Figure 6:
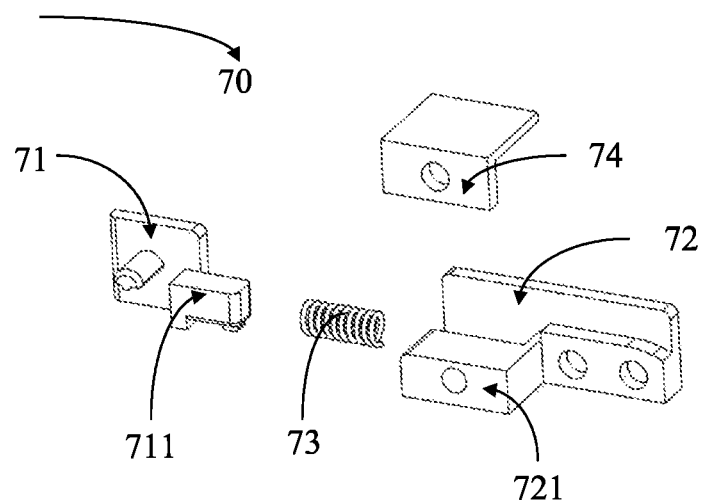
FIG. 6 is a partial enlarged diagram of a surface frame elastic apparatus in a foldable display device of the present application.

Refer to FIG. 6, which is a partial enlarged diagram of a surface frame elastic apparatus 70 in a foldable display device of the present application.

The surface frame apparatus 400 further comprises at least a surface frame elastic apparatus 70.

In an embodiment, a sidewall of the surface frame includes a surface frame elastic apparatus 70.

The surface frame slide apparatus 70 comprises:
a third component 71 comprising a second protrusion 711;
a fourth component 72 comprising a second groove 721;
an elastic component 73 disposed in the second groove 721, wherein the elastic component 73 in an embodiment is a spring;
a mounting plate 74 rigidly connected with the fourth component 72;
wherein when the display panel 200 is in a non-bending state, the second protrusion 711 is adjacent to the second groove 721 and presses the elastic component to dock with the second groove 721; and wherein when the display panel 200 is in a bending state, the second protrusion 711 is away from the second groove 721.

Figure 7:
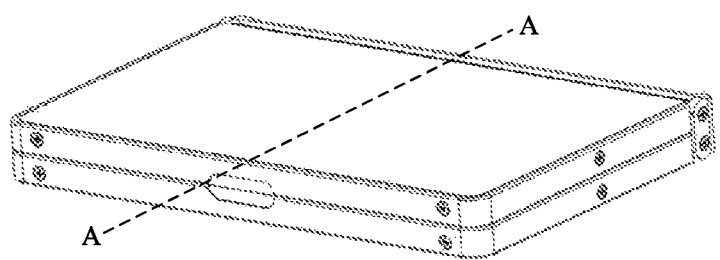
FIG. 7 is a three-dimensional structural diagram and a cross-sectional diagram of section A-A of a foldable display device in a bending state of the present application.
Figure 7:
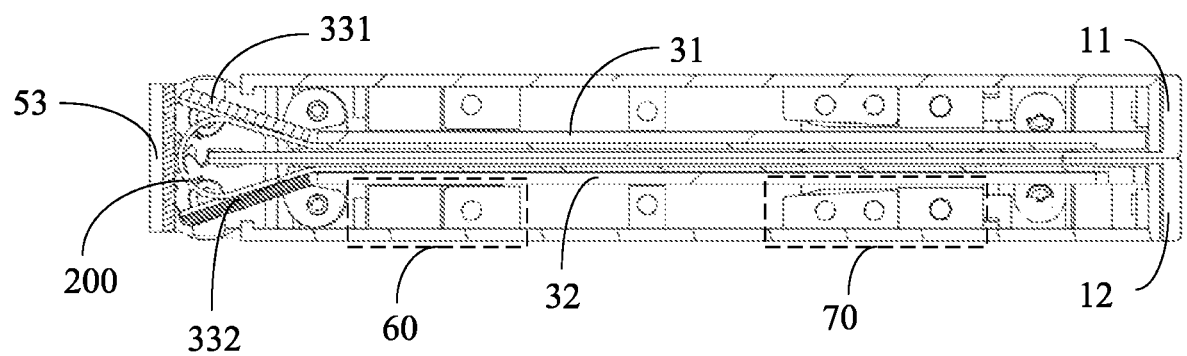

Refer to FIG. 7, which is a three-dimensional structural diagram and a cross-sectional diagram of section A-A of a foldable display device in a bending state of the present application.

When the foldable display device is in a bending state, the display panel is bent and the middle frame bending apparatus 33 and the surface frame form a first cavity 500. The panel bending region is placed in the first cavity 500 after being bent. The first movable plate 331 and the second movable plate 332 also enter the first cavity 500 at the same time. The first movable plate 331 or the second movable plate 332 drives the first component 61 away from the second component 62 and drives the third component 71 away from the fourth component 72. The bending region can naturally expand conformation to release stress, so as to avoid damage caused by the bending.

When the foldable display panel is in a non-bending state, the display panel 200 is in a flattened state. The panel bending region 20, the first movable plate 331, and the second movable plate 332 are away from the first cavity 500. The first movable plate 331 or the second movable plate 332 drives the first component 61 close to the second component 62 and drives the third component 71 close to the fourth component 72. A pre-tension of the foldable display device is provided to ensure the flatness of the display panel 200. In addition, a first supporting plane 511 on the first gear tooth 51 supports the first movable plate 331, and the second supporting plane 521 on the second gear tooth 52 supports the second movable plate 332, so as to ensure the flatness of the display panel 200.

The present application provides a foldable display device comprising: an outer case; a middle frame comprising a middle frame bending apparatus; a display panel comprising a panel bending region; and a surface frame apparatus comprising a surface frame with an opening, a surface frame bending apparatus, a surface frame slide apparatus, and a surface frame elastic apparatus. When the display panel is in a bending state, the middle frame bending apparatus and the surface frame bending apparatus form a first cavity, and the panel bending region is bent into the first cavity. When the display panel is in a non-bending state, the surface frame bending apparatus causes the panel bending region to be in a flattened state by supporting the middle frame bending apparatus. The present application can effectively release stress in a bending state by a combination of a surface frame bending device, a surface frame slide device, and a surface frame elastic device, thereby ensuring that the display panel can be smoothly bent without wrinkles and breakage damage.

As described above, although the present application has been described in preferred embodiments, they are not intended to limit the disclosure. One of ordinary skill in the art, without departing from the spirit and scope of the disclosure within, can make various modifications and variations, so the range of the scope of the disclosure is defined by the claims.

The invention claimed is:

1. A foldable display device, comprising:
an outer case comprising at least a housing;
a middle frame mounted to the outer case, wherein the middle frame comprises at least two frame plates and a middle frame bending apparatus located between the frame plates;
a display panel mounted to the middle frame, wherein the display panel comprises a panel bending region opposite to the middle frame bending apparatus; and
a surface frame apparatus mounted to the outer case and comprising:
at least a surface frame, wherein an opening is disposed in the surface frame, and the display panel is engaged into the opening;
a surface frame bending apparatus opposite to the middle frame bending apparatus;
a first surface frame and a second surface frame;
wherein when the display panel is in a bending state, the middle frame bending apparatus and the surface frame bending apparatus form a first cavity, and the panel bending region is bent into the first cavity; and
wherein when the display panel is in a non-bending state, the surface frame bending apparatus causes the panel bending region to be in a flattened state by supporting the middle frame bending apparatus;
wherein the surface frame bending apparatus comprises at least a first gear tooth disposed on the first surface frame and at least a second gear tooth disposed on the second surface frame;
wherein the first gear tooth on the first surface frame is engaged with the second gear tooth on the second surface frame; and
wherein the first gear tooth further comprises a first support plane, and the second gear further comprises a second support plane, wherein the first support plane and the second support plane are configured to support the middle frame bending apparatus.

2. The foldable display device according to claim 1, wherein the display panel is a flexible display panel.

3. The foldable display device according to claim 1, wherein the outer case is in a split type.

4. The foldable display device according to claim 1, wherein the display panel comprises:
a first region located at one side of the panel bending region and a second region located at another side of the panel bending region, and
wherein when the display panel is in the bending state, the first region is opposite to the second region.

5. The foldable display device according to claim 4, wherein the outer case comprises:
a first housing opposite to the first region; and
a second housing opposite to the second region, wherein the first housing and the second housing are connected with the surface frame by screw bolts.

6. The foldable display device according to claim 5, further comprising fifth through holes formed in the outer case, wherein the first housing and the second housing are connected with the surface frame by the screw bolts passing through the fifth through holes.

7. The foldable display device according to claim 6, further comprising at least four of the fifth through holes formed in the outer case.

8. The foldable display device according to claim 6, further comprising sixth through holes aligned with the fifth through holes in a one-to-one manner, wherein the outer case is rigidly connected to the surface shell by the screw bolts passing through the fifth through holes and the sixth through holes.

9. The foldable display device according to claim 8, wherein hole size of one of the fifth through holes is equal to hole size of the aligned one of the sixth through holes, and center of one of the fifth through holes is in a same straight line as center of the aligned one of the sixth through holes.

10. The foldable display device according to claim 5, wherein shape and size of the first housing is the same with shape and size of the second housing.

11. The foldable display device according to claim 4, wherein the outer case comprises a first housing opposite to the first region and a second housing opposite to the second region;
- wherein the first housing comprises two first housing sidewalls disposed in parallel and a first housing connecting wall vertically connected with the two first sidewalls;
- wherein the second housing comprises two second housing sidewalls disposed in parallel and a second housing connecting wall vertically connected with the two second sidewalls; and
- wherein the two first housing sidewalls together with the first housing connecting wall form a first housing open cavity, the two second housing sidewalls together with the second housing connecting wall form a second housing open cavity, and the display panel displays a picture through the first housing open cavity and the second housing open cavity.

12. The foldable display device according to claim 1, wherein the first surface frame comprises two first surface frame sidewalls in parallel and a first surface frame connecting sidewall vertically connected with the two first surface frame sidewalls; and
- wherein the second surface frame comprises two second surface frame sidewalls in parallel and a second surface frame connecting sidewall vertically connected with the two first surface frame sidewalls.

13. The foldable display device according to claim 12, wherein the first gear tooth and the second gear tooth are semicircular.

14. The foldable display device according to claim 13, wherein the first gear tooth is located at an edge of the first surface frame sidewall, and the second gear tooth is located at an edge of the second surface frame sidewall.

15. The foldable display device according to claim 1, wherein the surface frame bending apparatus further comprises:
- at least a connecting plate;
- at least two hinge plates oppositely disposed, protruding, and vertical to a surface at a side of the connecting plate, wherein the two hinge plates are disposed at two ends of the connecting plate, respectively; and
- each of the two hinge plates is disposed with a first through hole and a second through hole, wherein the first through hole is aligned with the first gear tooth, and the second through hole is aligned with the second gear tooth.

16. The foldable display device according to claim 15, wherein the first gear tooth is further disposed with a third through hole aligned with the first through hole, and the second gear tooth is further disposed with a fourth through hole aligned with the second through hole;
- wherein hole size of the first through hole is equal to hole size of the third through hole, and center of the first through hole is in a same straight line as center of the third through hole; and
- wherein hole size of the second through hole is equal to hole size of the fourth through hole, and center of the second through hole is in a same straight line as center of the fourth through hole.

17. The foldable display device according to claim 1, wherein the middle frame further comprises a first frame plate and a second frame plate disposed at two sides of the middle frame bending apparatus;
- wherein each of the first frame plate and the second frame plate is aligned with the housing, and each of the first frame plate and the second frame plate together with the housing form a gap;
- wherein the middle frame bending apparatus comprises a first movable plate and a second movable plate, wherein the first movable plate is rotatably mounted on the first surface frame, and the second movable plate is rotatably mounted on the second surface frame;
- wherein when the display panel is in a non-bending state, upper surfaces of the frame plates, the first movable plate, and the second movable plate are located in a same plane; and
- wherein when the display panel is in a bending state, the first movable plate and the second movable plate are moved into the first cavity.

18. The foldable display device according to claim 1, wherein the surface frame apparatus further comprises at least a surface frame slide apparatus; and
- wherein the surface frame slide apparatus comprises:
  - a first component disposed with a first protrusion;
  - a second component disposed with a first groove;
  - wherein when the display panel is in a non-bending state, the first protrusion is adjacent to the first groove and is docked with the first groove; and
  - wherein when the display panel is in a bending state, the first protrusion is away from the first groove.

19. The foldable display device according to claim 1, wherein the surface frame apparatus further comprises at least a surface frame elastic apparatus; and
- wherein the surface frame slide apparatus comprises:
  - a third component comprising a second protrusion;
  - a fourth component comprising a second groove;
  - an elastic component disposed in the second groove;
  - a mounting plate rigidly connected with the fourth component;
  - wherein when the display panel is in a non-bending state, the second protrusion is adjacent to the second groove and presses the elastic component to dock with the second groove; and
  - wherein when the display panel is in a bending state, the second protrusion is away from the second groove.

* * * * *